US011940778B2

(12) United States Patent
Braun et al.

(10) Patent No.: US 11,940,778 B2
(45) Date of Patent: Mar. 26, 2024

(54) METHOD OF COMMISSIONING A FIELD DEVICE IN AN INDUSTRIAL SYSTEM NETWORK

(71) Applicant: ABB Schweiz AG, Baden (CH)

(72) Inventors: Roland Braun, Niederkassel Luelsdorf (DE); Francisco Mendoza, Schriesheim (DE); Dirk Schulz, Meckenheim (DE); Heiko Koziolek, Karlsruhe (DE); Andreas Burger, Weingarten (DE)

(73) Assignee: ABB Schweiz AG, Baden (CH)

( * ) Notice: Subject to any disclaimer, the term of this patent is extended or adjusted under 35 U.S.C. 154(b) by 217 days.

(21) Appl. No.: 17/320,236

(22) Filed: May 14, 2021

(65) Prior Publication Data

US 2021/0286346 A1    Sep. 16, 2021

Related U.S. Application Data

(63) Continuation of application No. PCT/EP2019/080902, filed on Nov. 11, 2019.

(30) Foreign Application Priority Data

Nov. 14, 2018   (EP) .................................. 18 206 305

(51) Int. Cl.
*G05B 19/418* (2006.01)

(52) U.S. Cl.
CPC ... *G05B 19/41855* (2013.01); *G05B 19/4183* (2013.01); *G05B 19/41835* (2013.01);
(Continued)

(58) Field of Classification Search
USPC ......................................................... 700/19
See application file for complete search history.

(56) References Cited

U.S. PATENT DOCUMENTS 11,500,349 B2 * 11/2022 Altendorf .............. G06N 20/00
2007/0250180 A1   10/2007 Bump et al.
(Continued)

FOREIGN PATENT DOCUMENTS

CN     106250384 A  * 12/2016  ......... G06F 16/2228
EP        2911024 A1 *  8/2015  ......... G05B 19/0423
(Continued)

OTHER PUBLICATIONS

Mauro Onori et al., "The IDEAS Plug & Produce System," International Conference on Advanced Manufacturing Engineering and Technologies, pp. 1-8, Oct. 2013, Newtech, Stockholm, Sweden.
(Continued)

*Primary Examiner* — Hien D Khuu
(74) *Attorney, Agent, or Firm* — Leydig, Voit & Mayer, Ltd.

(57) ABSTRACT

A method of commissioning a field device in an industrial system network includes: a) connecting a field device to an industrial system network; c) providing information about the field device, the information including functional information for the field device; d) utilizing the functional information for the field device to retrieve information relating to a role of the field device in an automation application; f) utilizing capability information relating to a field device type of the field device and the information relating to the role of the field device in the automation application to retrieve a parameter set for the field device for operation in the automation application; and g) downloading the parameter set to the field device.

10 Claims, 7 Drawing Sheets

(52) U.S. Cl.
CPC ............. *G05B 2219/23336* (2013.01); *G05B 2219/25062* (2013.01); *G05B 2219/25428* (2013.01)

(56) References Cited

U.S. PATENT DOCUMENTS

| | | | | |
|---|---|---|---|---|
| 2008/0301270 | A1* | 12/2008 | John | G05B 19/0421 709/221 |
| 2013/0031249 | A1 | 1/2013 | Gunzert et al. | |
| 2013/0095847 | A1* | 4/2013 | Powell | H04W 64/00 455/456.1 |
| 2013/0211547 | A1 | 8/2013 | Buchdunger et al. | |
| 2014/0089501 | A1* | 3/2014 | Hoferlin | H04L 67/52 709/224 |
| 2015/0058480 | A1* | 2/2015 | Allgaier | H04L 61/106 709/224 |
| 2017/0034308 | A1* | 2/2017 | Kande | H04L 67/125 |
| 2017/0093621 | A1 | 3/2017 | Wagener et al. | |
| 2018/0101152 | A1* | 4/2018 | Jundt | G05B 19/0425 |
| 2018/0210429 | A1* | 7/2018 | Jundt | G05B 23/0224 |
| 2019/0018374 | A1* | 1/2019 | Kanokogi | G05B 13/0265 |
| 2020/0183665 | A1* | 6/2020 | Kamath | G06F 8/38 |

FOREIGN PATENT DOCUMENTS

| | | | | |
|---|---|---|---|---|
| EP | | 3217694 A1 * | 9/2017 | ............ H04L 63/18 |
| JP | | 2018014108 A * | 1/2018 | ........... G05B 19/042 |
| WO | WO-2015114577 A1 * | 8/2015 | ........... H04L 67/125 | |
| WO | WO-2016070899 A1 * | 5/2016 | ......... G05B 19/4185 | |
| WO | WO-2017002019 A1 * | 1/2017 | | |

OTHER PUBLICATIONS

Kai Krüning, "Plug and Produce with Fieldbus Components," (2013): atp edition—Automatisierungstechnische Praxis, Oct. 2013, pp. 50-56, Fachzeitschrift atp magazine, Essen, Germany.

Lars Dürkop et al., "Using OPC-UA for the autoconfiguration of real-time ethernet systems," International Conference on Industrial Informatics, pp. 248-253, Jul. 2013, IEEE, Bochum, Germany.

Reinhart G. et al., "Automatic configuration (Plug & Produce) of Industrial Ethernet networks," IEEE/IAS International Conference on Industry Applications (INDUSCON), Nov. 2010, pp. 1-6, IEEE, Sao Paulo, Brazil.

Hammerstingl, V et al., "Unified Plug&Produce architecture for automatic integration of field devices in industrial environments," IEEE International Conference on Industrial Technology (ICIT), Mar. 2015, pp. 1956-1963, IEEE, Seville, Spain.

Koziolek et al., "Self-Commissioning Industrial IoT-Systems in Process Automation: A Reference Architecture," Computer Science, 2018 IEEE International Conference on Software Architecture (ICSA), Apr. 2018, pp. 196-205, IEEE, Seattle, WA, USA.

* cited by examiner

METHOD OF COMMISSIONING A FIELD DEVICE IN AN INDUSTRIAL SYSTEM NETWORK

CROSS-REFERENCE TO PRIOR APPLICATIONS

This application is a continuation of International Patent Application No. PCT/EP2019/080902, filed on Nov. 11, 2019, which claims priority to European Patent Application No. EP 18 206 305.7 filed on Nov. 14, 2018. The entire disclosure of both applications is hereby incorporated by reference herein.

FIELD

The present invention relates to a method of commissioning a field device in an industrial system network.

BACKGROUND

The commissioning of field devices in industrial system networks requires manual intervention that leads to errors, and costs time and effort.

There is a need to address this issue.

Therefore, it would be advantageous to have means to reduce or remove manual intervention for the commissioning of field devices in an industrial system network.

SUMMARY

In an embodiment, the present invention provides a method of commissioning a field device in an industrial system network, the method comprising: a) connecting a field device to an industrial system network; c) providing information about the field device, the information comprising functional information for the field device; d) utilizing the functional information for the field device to retrieve information relating to a role of the field device in an automation application; f) utilizing capability information relating to a field device type of the field device and the information relating to the role of the field device in the automation application to retrieve a parameter set for the field device for operation in the automation application; and g) downloading the parameter set to the field device.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an aspect, there is provided a method of commissioning a field device in an industrial system network. The method comprises:
a) connecting a field device to an industrial system network;
c) providing, information about the field device, the information comprising functional information for the field device;
d) utilizing the functional information for the field device to retrieve information relating to a role of the field device in an automation application;
f) utilizing capability information relating to the field device type and the information relating to the role of the field device in the automation application to retrieve a parameter set for the field device for operation in the automation application; and
g) downloading the parameter set to the field device.

In an example, the functional information for the field device comprises an identity of the field device.

In an example, the identity of the field device is inferred from the industrial system network.

In an example, the identity of the field device is determined from one or more of: a location of the field device in the industrial system network; an identity of one or more devices that are neighbours to the field device; human input.

In an example, the functional information for the field device comprises at least one capability of the field device In an example, step c) comprises providing by the field device the information about the device.

In an example, the method comprises step b), providing the field device with an address.

In an example, the address is a network address.

In an example, step b) comprises collecting meta data for the field device and for at least a part of the industrial system network in order to generate the address that is then provided to the field device.

In this manner, a DNS name can be generated and provided to the field device, that incorporates application related semantics into a station name of the field device. Thus, using a field device (DNS) name helps operators to retrieve/identify devices more efficiently and easily.

In an example, the method comprises step e), utilising the information about the field device, provided by the field device, to retrieve at least some of the capability information.

In an example, the at least some of the capability information is retrieved from a server separate to the field device.

In an example, in step c) the information about the field device provided by the field device comprises at least some of the capability information.

In an example, in step d) the information relating to the role of the field device is retrieved from a server separate to the field device.

In an example, in step f) the parameter set is retrieved from a server separate to the field device.

In an example, the parameter set comprises data relating to a different device of the same device type.

In an example, the method comprises mapping the parameter set to the field device.

In an example, the mapping comprises a process of converting at least some of the data of the parameter set.

In this way, a parameter set can be for an older device of the same device family, and this older parameter set can be mapped to the newer field device, involving if necessary some data conversion. In this manner, device replacement is simplified.

In an example, the method comprises step h), implementing a browsing process to match a controller to the field device, the matching comprising utilization of control related functionality for the field device.

In an example, the control related functionality comes from an information model implemented in the field device.

In an example, the control related functionality for the field device is comprised within the functional information provided by the device.

FIGS. 1-7 relate to a method of commissioning a field device in an industrial system network. The method of commissioning a field device in an industrial system network comprises:
  a) connecting a field device to an industrial system network;
  c) providing, information about the field device, the information comprising functional information for the field device;
  d) utilizing the functional information for the field device to retrieve information relating to a role of the field device in an automation application;
  f) utilizing capability information relating to the field device type and the information relating to the role of the field device in the automation application to retrieve a parameter set for the field device for operation in the automation application; and
  g) downloading the parameter set to the field device.

According to an example, the functional information for the field device comprises an identity of the field device.

According to an example, the identity of the field device is inferred from the industrial system network.

According to an example, the identity of the field device is determined from one or more of: a location of the field device in the industrial system network; an identity of one or more devices that are neighbours to the field device; human input.

According to an example, the functional information for the field device comprises at least one capability of the field device According to an example, step c) comprises providing by the field device the information about the device.

According to an example, the method comprises step b), providing the field device with an address.

According to an example, the address is a network address.

According to an example, step b) comprises collecting meta data for the field device and for at least a part of the industrial system network to generate the address that is then provided to the field device.

According to an example, the method comprises step e), utilising the information about the field device, provided by the field device, to retrieve at least some of the capability information.

According to an example, the at least some of the capability information is retrieved from a server separate to the field device.

According to an example, in step c) the information about the field device provided by the field device comprises at least some of the capability information.

According to an example, in step d) the information relating to the role of the field device is retrieved from a server separate to the field device.

According to an example, in step f) the parameter set is retrieved from a server separate to the field device.

According to an example, the parameter set comprises data relating to a different device of the same device type.

According to an example, the method comprises mapping the parameter set to the field device.

According to an example, the mapping comprises a process of converting at least some of the data of the parameter set.

According to an example, the method comprises step h), implementing a browsing process to match a controller to the field device, the matching comprising utilization of control related functionality for the field device.

According to an example, the control related functionality comes from an information model implemented in the field device.

According to an example, the control related functionality for the field device is comprised within the functional information provided by the device.

Continuing with the figures, a plug and produce system implementing the method of commissioning a field device in an industrial system network is shown and is now described in detail.

Figure 1:
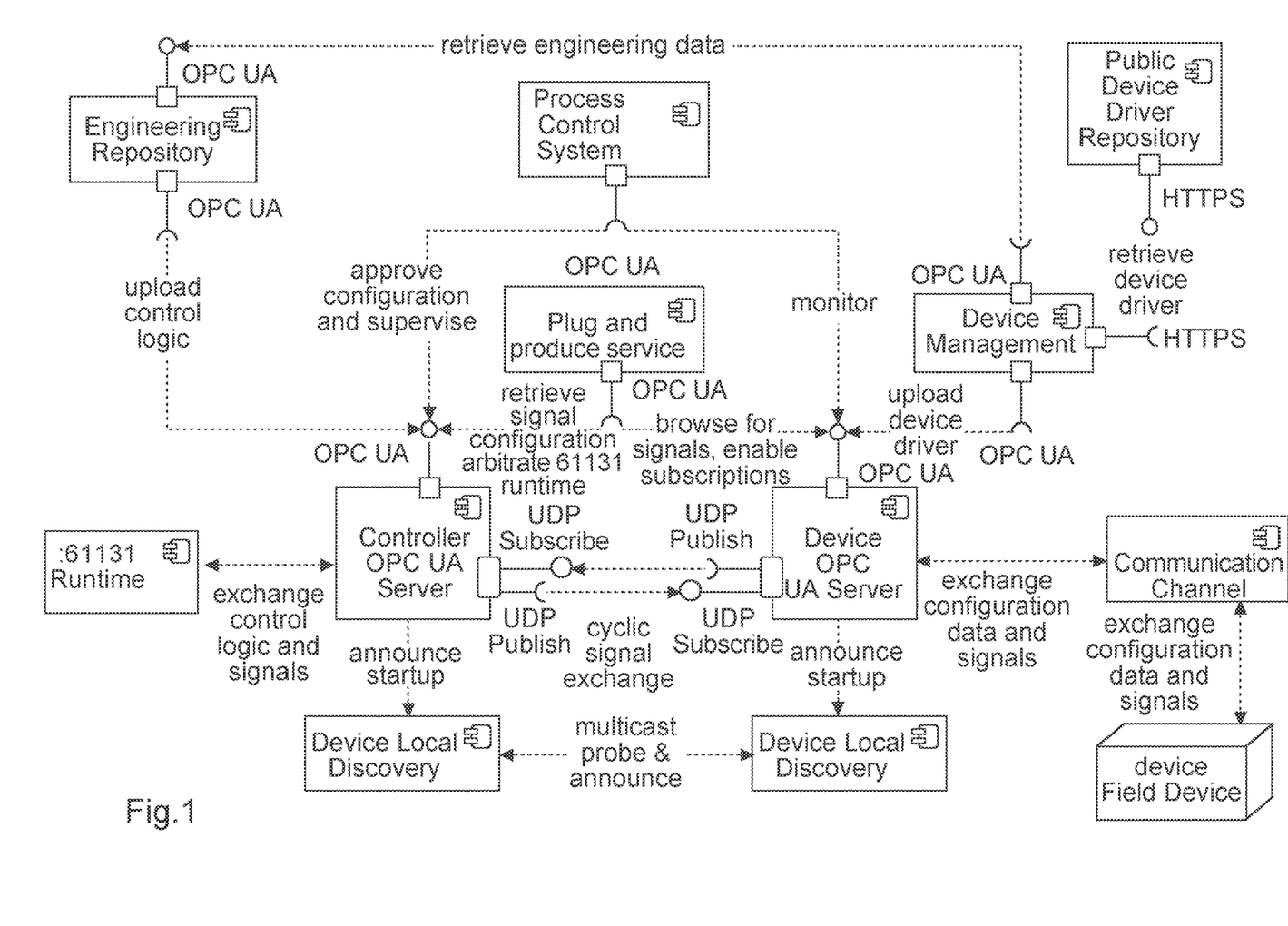
FIG. 1 shows a detailed static view of an architecture implementing an example of a method of commissioning a field device in an industrial system network.

FIG. 1 depicts a static view of the reference architecture, which focuses on ANSI/ISA-95 level 2 and 1. Controllers and field devices communicate via OPC UA over Ethernet both for commissioning and operation. Existing field buses and analog connections may be included by having an IO gateway node that arbitrates between the different networks. With the OPC UA servers, controllers and field devices become IIoT devices, which can be accessed from the internet if desired by the plant owner and are capable of self-description.

Specifically, FIG. 1 shows a Controller OPC UA Server that stores control logic programs and controller status information. There is also a Device OPC UA Server providing data and services for the connected field devices. While classical client/server connections manage the self-commissioning of controllers and field devices, the cyclic, real-time communication for closed-loop control is supported by OPC UA publish/subscribe connections (IEC 62541-14).

With TSN-enabled network switches, a deterministic real-time control loop becomes possible. The publish/subscribe communication can either be broker-based (e.g., via AMQP or MQTT) or broker-less. In the latter case, publishers send data sets to multicast IP addresses via UDP, to which subscribers listen. Using lower-level network protocols IGMP or MMRP, network traffic can be reduced, so that the network switches only forward network packets for which a subscriber has been registered.

For discovery of connected OPC UA servers, the reference architecture suggests an OPC UA Controller Local Discovery server and a Device Local Discovery server according to IEC 62541-12. Resource-constrained devices can alternatively use Multicast DNS (mDNS) instead of local discovery servers, which is for example also implemented by Apple Bonjour or Spotify Connect. mDNS can use DNS SRV records to advertise discovery URLs for OPC UA servers to clients.

A controller in the reference architecture provides an IEC 61131 Runtime that can execute PLCopen control logic programs (R5). It can import PLCopen-compliant control logic from the Engineering Repository via the Controller OPC UA Server. The control logic exposes function blocks that require connected input signals, e.g., from a sensor such as a level indicator. The control algorithm then computes output values, e.g., for an actuator such as a valve for a heat exchanger. Control algorithms run cyclically, e.g., every 100 ms, and for special applications even every 1 ms. The 61131 Runtime is decoupled from the actual field device and can run on different deployment targets.

OPC UA servers expose information about field devices in the reference architecture. Such a server may run on a dedicated network node or directly on a field device, if it has appropriate CPU capability and memory. On a dedicated node such as an IO gateway, the server may manage data and services for numerous field devices. The Field Device is connected to the OPC UA server via a Communication Channel. This may encapsulate fieldbus or analog communication, in which case it needs to be configured appropriately.

The Device Management is responsible for supplying a Communication Channel with drivers and the field device with a parameterization. It gets the driver from a Public Device Driver Repository, e.g., from specific vendors or other organizations. For example, the Fieldcom Group is in the process of setting up such a server for FDI Device Packages. Parameterization can rely on imported engineering data, and if necessary for fine tuning also be altered via user input from OPC UA clients. To get a device running with basic features, the imported engineering data is however sufficient. The Device Management uploads the parameterization to the field device.

Finally, the architecture contains a Plug and Produce Service that looks for connected controllers and handles the signal matching with field devices. It has a built-in OPC UA client to retrieve required signal names from the controller and to browse OPC UA servers for field devices for the matching signal names. It is aware of different semantic standards, such as OPC UA for Devices, IEC 61987, or NAMUR NE131, which aids in executing the signal matching. It may be deployed for example on an Industrial PC or a controller.

Figure 2:
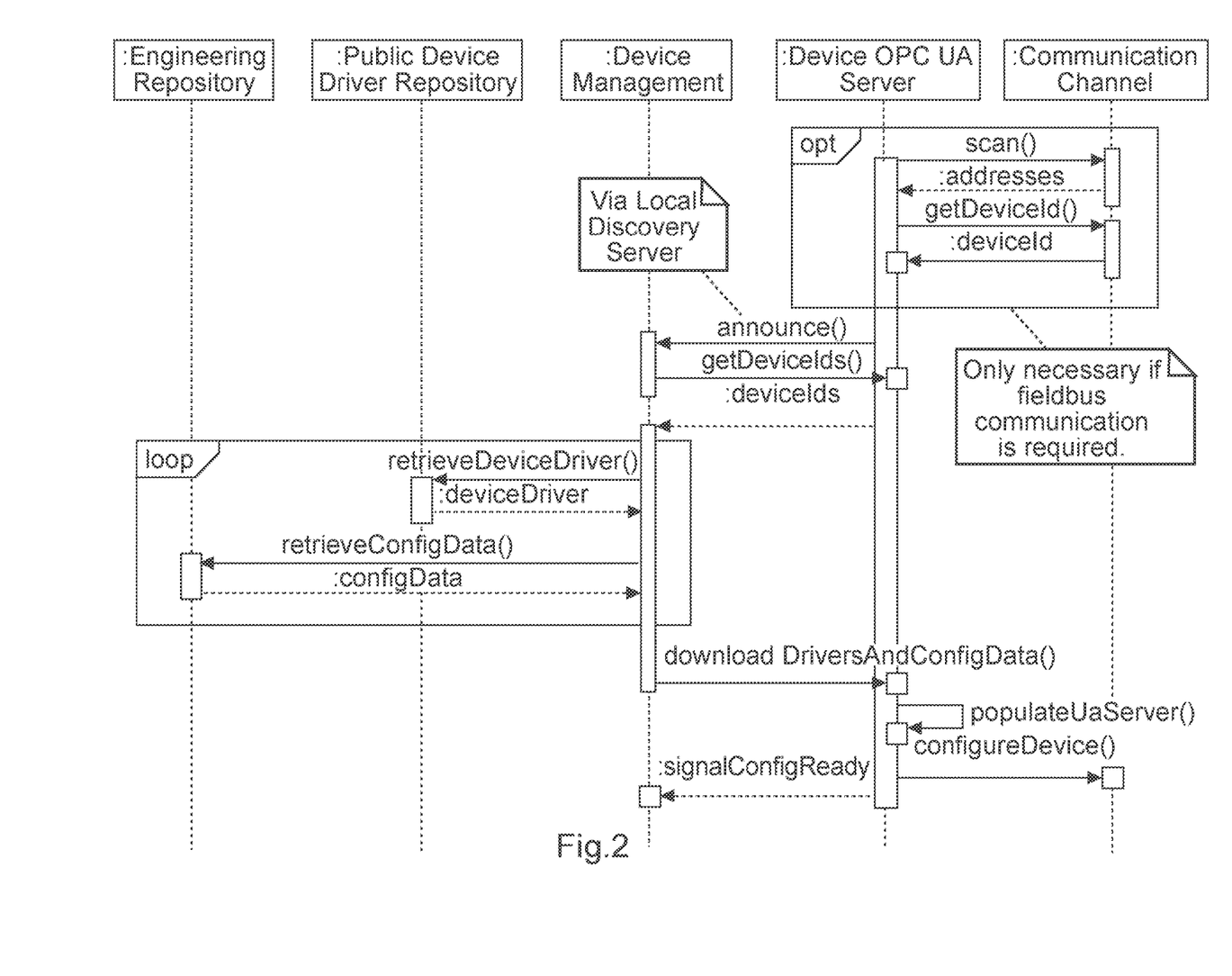
FIG. 2 shows a detailed example of device discovery and parametrization (UML interaction Diagram) within an example of a method of commissioning a field device in an industrial system network.

The device parametrization follows the procedure in FIG. 2. First, the Device OPC UA Server optionally scans its connected Communication Channels, in case the field device is connected via an additional network connection. Otherwise, this step can be omitted. Then, it announces itself on the network, which gets picked up by the Device Management component.

The Device Management retrieves the device IDs of the connected field devices, which may be composed of manufacturer name, product type id, and serial number (cf. IEC 62541-100).

If the Device OPC UA Server does not supply an ID or if the supplied ID is unknown or of an unknown format for the Device Management, it can try to infer the device identity from contextual information. The Device Management may for example analyze the network address of the device and determine surrounding devices in the same subnet. If these devices are known to the Device Management, and the Engineering Repository includes specification of devices in the same area that are not yet found on the network, it can predict which device has been connected. The device may also carry other information, e.g., geolocation, known properties of device type characteristics, or references to other device, which may help to infer its identity. If the Device Management cannot determine the device identity with any of the described methods, it can query a human user for input and thus retrieve the device ID.

Using the IDs, it queries the Public Device Driver Repository for device drivers and the Engineering Repository parameterization data. If the device has no meaningful host name, the Device Management can generate such a name by incorporating information from the device's OPC UA server. The Engineering Repository may contain parameterization data for an older type of the device, for example in case a device has be replaced with a newer version. In this case, the Engineering Repository can provide a mechanism that allows mapping parameters from one device type to another device type, if the devices belong to the same family or at least have a significant overlap of functionality. The mapping may involve altering parameter names, changing the parameter types (e.g., convert 32-bit encoding to 64-bit encoding), and even changing parameter values (e.g., converting a predefined parameter value range to another range).

It uploads the information to the OPC UA server, which forwards it to the actual field devices. Finally, the OPC UA server updates its contents and signals its readiness to the Device Management. After this update process, the field device is readily parameterized.

Figure 3:
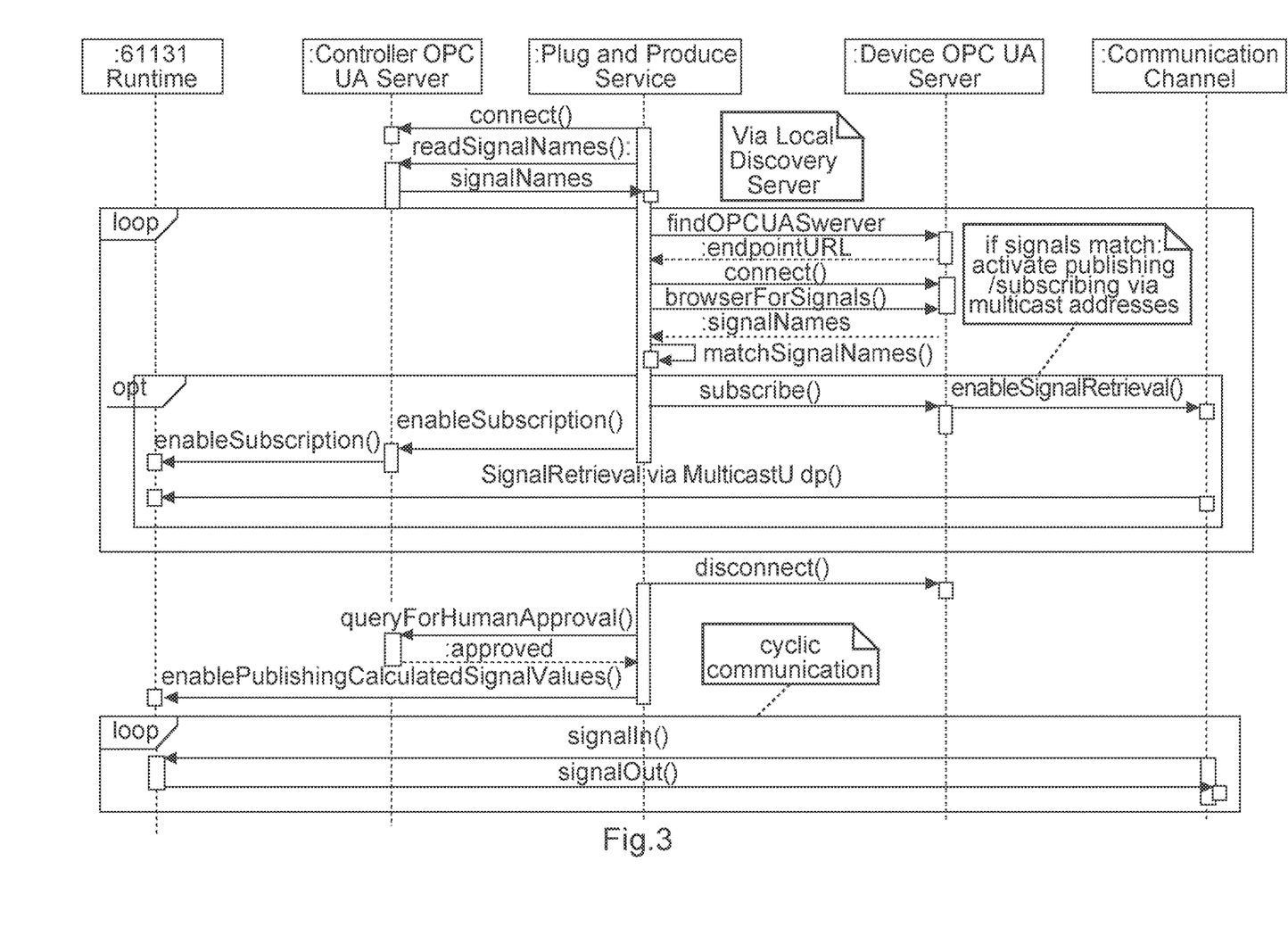
FIG. 3 shows a detailed example of signal matching (UML interaction Diagram) within an example of a method of commissioning a field device in an industrial system network.

Now, signal matching can start as shown in FIG. 3. The Plug and Produce Service constantly searches for Controller OPC UA servers connected to the network. It connects to such servers and retrieves a list of the input and output signals required for the execution of the configured control logic programs. Then, the service connects to any Device OPC UA servers that are already connected or are being connected during plant commissioning.

The Plug and Produce Service browses the OPC UA server's address space and tries to find a matching tag name for the configured device. It then searches for PLCopen function blocks with a specification of input signals (mainly for actuators) and output signals (mainly for sensors). Once found, it attempts to find a match with the signal names from the controller. In case the controller and the device use different signal names, since they have been configured independently, matching may also rely on other information, such as the physical location and network configuration in the OPC UA address space.

In case of a match, the Plug and Produce Service sets up a subscription of the controller to the output signals. This can either be an OPC UA client/server connection, which then requires handling a client session on the Device OPC UA server, or it can be an OPC UA publish/subscribe connection via multicast UDP/IP or a broker. For fast cyclic control, the Controller OPC UA Server may bypass writing the signal values into its address space, but instead directly forward them to the 61131 Runtime for calculating the control logic outputs.

After setting up the subscription, the Plug and Produce Service disconnects from the Device OPC UA server, and sets a flag in the Controller OPC UA server to query a human engineer for final approval. The found configuration can be relayed to the engineer, who can perform a final checkup, before actually starting the process.

Figure 4:
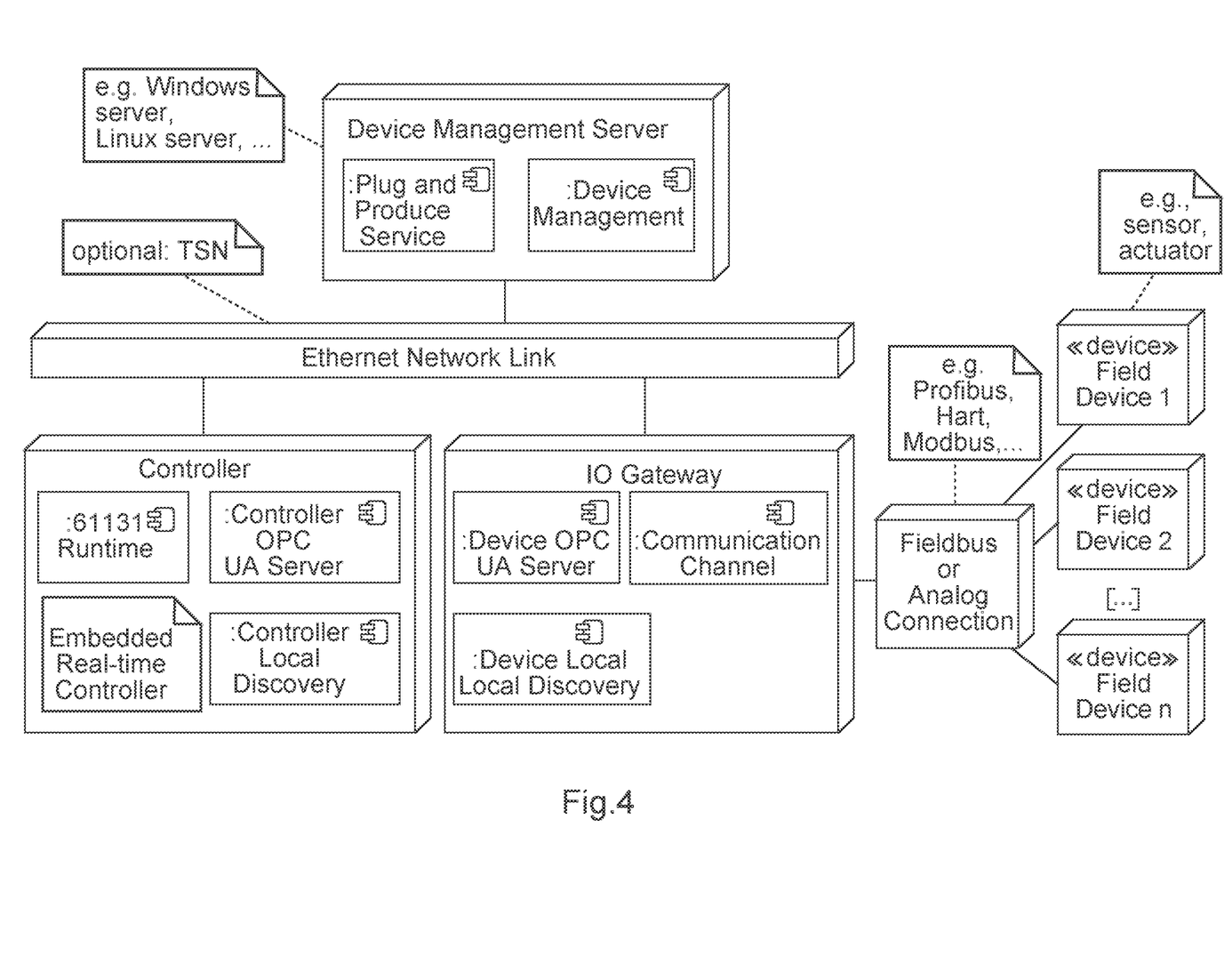
FIGS. 4-5 show detailed examples of the deployment of components to hardware nodes within an example of a method of commissioning a field device in an industrial system network.
Figure 5:
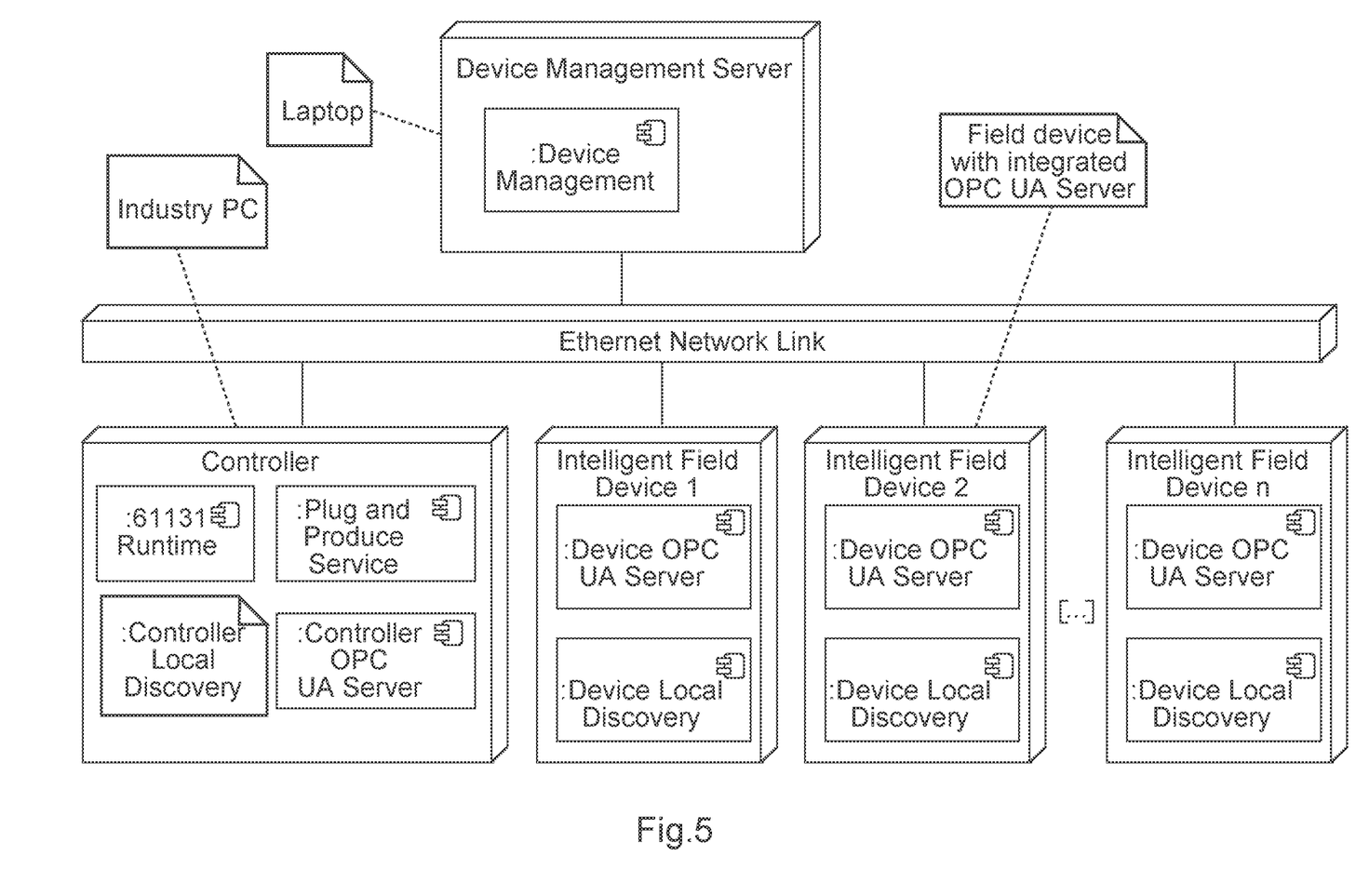

The deployment of the components to hardware nodes is flexible and allows addressing different application contexts and resource constraints. FIGS. 4 and 5 show two different variants, with FIG. 4 showing a classical set up (UML Deployment Diagram), and with FIG. 5 showing a set up with Intelligent Field Devices (UML Deployment Diagram).

The classical deployment in FIG. 4 features a controller device, an IO gateway with connected field devices, and a device management server. The latter also hosts the Plug and Produce Service, which can then serve different controllers and IO gateways connected to the Ethernet network link. The benefit of this deployment is investment protection. It does not require IIoT-enabled field devices, as the IO gateway manages the required IIoT communication. Existing installations with fieldbuses or analog connections can be updated with small additions to the hardware.

The deployment with intelligent IIoT field devices (FIG. 5) does not include an IO gateway device. Field devices have sufficient computing power and memory, and network interfaces to host their own OPC UA servers and expose them on the Ethernet network link. As a deployment variant, the controller device hosts the Plug and Produce Service and thus becomes a self-contained autonomous agent with the ability to configure itself given network access.

Many other forms of deployment are conceivable, e.g., hosting the 61131 runtime on a powerful actuator, a plant-side server, or on cloud platforms. These deployments depend on the specific application context, business constraints, and available hardware.

Figure 6:
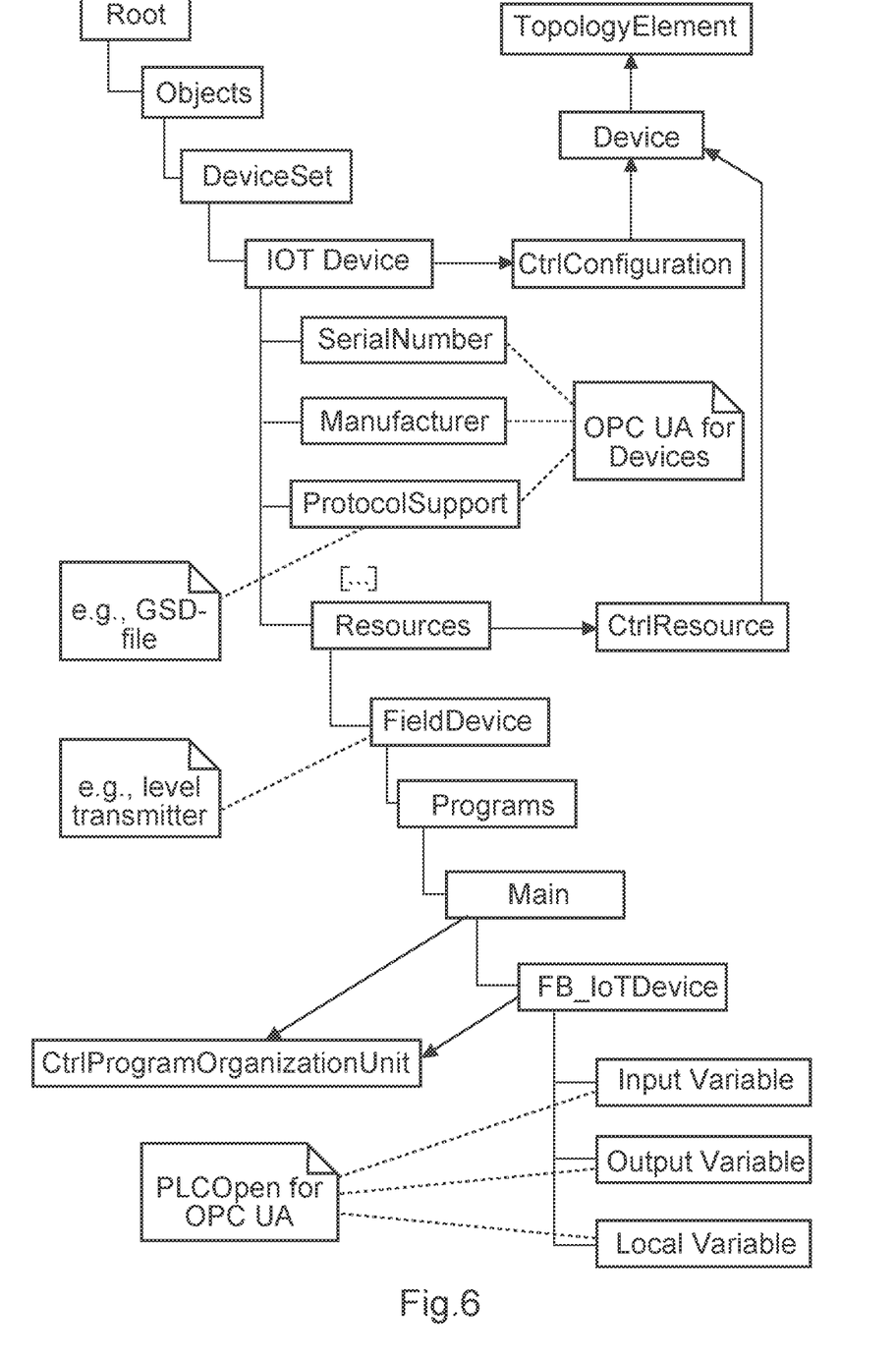
FIG. 6 depicts an excerpt of the OPC UA address space of the device OPC UA server.

FIG. 6 depicts an excerpt of the OPC UA address space of the Device OPC UA server. The address space follows the OPC UA for Devices specification and contains a DeviceSet in its object tree. The included IoTDevice is a special CtrlConfiguration according to PLCopen and also a Device itself. Thus, it exposes important identification information, such as serial number, manufacturer and required communication protocols.

As suggested by this reference architecture, the IoTDevice contains a special function block that exposes its input and output variables, which is normally only prescribed for controllers. This function block on the device is independent of any application or control function running on top of it. The Plug and Produce Service uses this information to match the signal names from the controllers.

The following provides further information on specifics of the method of commissioning a field device in an industrial system network.

PNP Service Specifications

The following section specifies different services of the Plug-and-Produce Service (PnPService) from FIG. 1, which are used to fulfill the plug-and-produce functionality. The services are described with the focus that the reader of this document should be able to implement them. For each service, a detailed description is given and the service's in- and outputs. Additionally to some core services, also provided is a pseudo code abstraction of the implementation created.

findServers

The findServers functionality allows identifying OPC UA server available in the network and make them accessible for further processing within the PnPService.

The findServers service returns the servers known to a server or a discovery server. The detailed behavior of Discovery Servers is described in detail for example in the paper by L. Dürkop et al, Using OPC-UA for the Autoconfiguration of real-time Ethernet Systems, In Industrial Informatics (INDIN), Jul. 2013 11 IEEE International Conference pp 248-253. Additionally, if, for example, resource constraints within a device exist, the same behavior can be implemented by using the multicast DNS (mDNS) protocol. The PnPService uses discovery methods to identify all available OPC UA servers within the network in order to support the self-commissioning step. Hence, the PnPService also filters the already exploited OPC UA servers in order to avoid a double processing of devices.

The mDNS version of this service needs no specific parameters.

Browse

The PnP Service provides a browse functionality to scan through an OPC UA information model and check for signals, which can be matched to each other.

The browse service analyzes the information model of the discovered OPC UA servers. Once the findServers service identified an OPC UA endpoint, the browse service starts to connect to this server and browse its information model. Thereby the service starts for browsing of types, which are inherited by PLCopen [3] types. Once they are identified, they are stored by the service for the second stage of the browsing process. In this second stage the browse service looks for instances of the collect PLCopen types. During the two-staged browsing process, the service follows only hierarchically references of the information model by using the depth-first-search algorithm (DFS). At each node, the browse service calls the match service to look for possible matches between identified signals of the control logic and potential in- and output signals of the browsed device. By using this match service, the browse service can be used also for non-PLCopen conform information models. The following pseudo code snippet visualize the functionality of the browse service. It also includes the match service call for each node.

Listing 1 Implementation of Browse Service

```
int     PnPService::browse(NodeId     node_id,     list
    <MatchingRule*>m_rules, int browseDir)
    for MatchingRule m_rule in m_rules do
        m_rule→match(node_id, pMyClient) then
            //tuple of node id and browse name of matched
                node
            t=tuple(m_nodeid, m_browseName);
            store tuple in result list
        end if
    end for
    //expand method of DFS; follow hierarchical refer-
        ences and push them on stack expand(node_id,
        browseDir)
    while I stack.empty( ) do
        NodeId new_node_id=stack.pop( );
        //call browse service recursively
        browse(new_node_id, m_rules, browseDirection);
    end while
    //once stack is empty return
    return 0;
```

Parameters

IN:
  the ID of the current node
  a list of matching rules which should be applied during the browse process
  Integer which indicates the browse direction, following the OPC UA specification for references OUT:
  positive matched nodes are stored in a global list Match This service matches two signals to each other as long they fulfill the matching criteria described in a so-called matching rule object.

The match service is used to identify which input signal of a device fits to an output signal of the control logic and vice versa. The service itself can only be used together with the browse service. It cannot be invoked by itself. Hence so-called matching rule objects needs to be implemented and added to the browse service. These matching rule objects check at each node if the in/out signals may fit to a signal of the control logic. If they fit, due to the specification of the matching rule objects, the PnPService will take care of it, and subscribe to the necessary multicast address to start publishing the signal within a specific multicast group.

Parameters
IN:
   the ID of the current node
   pointer to an OPC UA client instance to get if necessary more information from the current node
OUT:
   a Boolean indicating a positive or a negative matching result MatchingRule A matching rule is an object, which inherits from a base class and provides the functionality to match two given signals as NodeIds to each other.

The matching rule concept allows for easily extending the PnPService with different business logic for matching signals of a controller and a device. Due to that, this is not a clear service of the PnPService but a core functionality to keep the PnPService flexible and easily extensible. The following pseudo code shows the structure of the base class and its functionality, which needs to be implemented by derived objects.

Listing 2 Implementation of the MatchingRule Base Class

```
class MatchingRule
{
public:
   MatchingRule( );
   virtual ~MatchingRule( );
   // core matching functions
   virtual bool match(NodeId &ua_node_id, OPCU-
      AClient*opc_uaclient);
   // nodeId and browse name of matched signal; only to
      buffer the data after a match;
   // will be overwritten by the next match;
   NodeId m_nodeid;
   std::string m_browseName=" ";
private:
   // possible identification member variables of the cer-
      tain matching rule
   int mid;
   std::siring name;
};
```

These matching objects are used in the match service to identify which nodes/signals should be matched to each other. A match indicates to subscribe or publish this value stored within the node depending on the type of the signal (in- or output signal).

addNodes

The addNodes service is designed for adding a propriety signal structure to the controller storing necessary information for matching the in- and output signals. This structure is not necessary if the controller supports PLCopen.

The addNodes services enables to add nodes to the information model during runtime. The PnPService uses this functionality to support controllers or devices that are not PLCopen conform. These devices are supported by adding a specific node structure to the information model, storing details about their in- and output signals, datatype, and endpoint information. Afterwards, the PnPService uses this data to realize the matching between two signals.

Parameters
IN:
   A list of nodes to add to the information model
   Endpoint url
OUT:
   Status flag Run This subsection describes the runtime functionality of the PnPService.

At start up, the PnP Service updates its matching table. This means the PnP Service retrieves all in- and output signals from the controller to provide input for the match service. During runtime, the PnP Service itself is organized in different states. Most of these states are set internally for example to check if a new device that was not explored before is available (state_new_device_is_available). Nevertheless, some of them are set externally, especially from other functionalities of the PnP Service like the replacement functionality (state_matching_mode). While the PnP Service is in the matching mode, it waits for a new device, which was not browsed before.

The communication between its discovery server listener is done via a message queue. Once a new endpoint is received, the PnP Service updates the signal matching table, which contains signals from the controller and already matched signals from the devices to the controller. If not all signals are matched, the PnP Service calls the browse service. If after such a browse process all signals are matched, the PnP Service will no longer try to match signals even a new device will be available. The pseudo code below will give a rough understanding of the process flow of the PnP Service.

Listing 3 Implementation of PnP Service Run Method

```
void *PnPServiceProvider::run(void* arg)
   //update signals matching table
   PnPService update signals from controller
   while true do
      if state_matching_mode then
         while ! state_new_device_is_available do
            //blocked till new opc ua endpoint is send via
               message queue
            size=message queue receive new opc ua end-
               point
            if size==-1 then
               "message queue receive failed";
            else
               state_new device_is_available=true
            end if
         end while
         //update signals matching table
         PnPService update signals from controller
         if ! state_all_signals_matched then
            state_new device_is_available=false
            PnPService start browse service
         end if
         state_all_signals_matched=PnPService check if
            all signals are matched
         state_matching_mode=false
      end if
   end while
```

HMI

Figure 7:
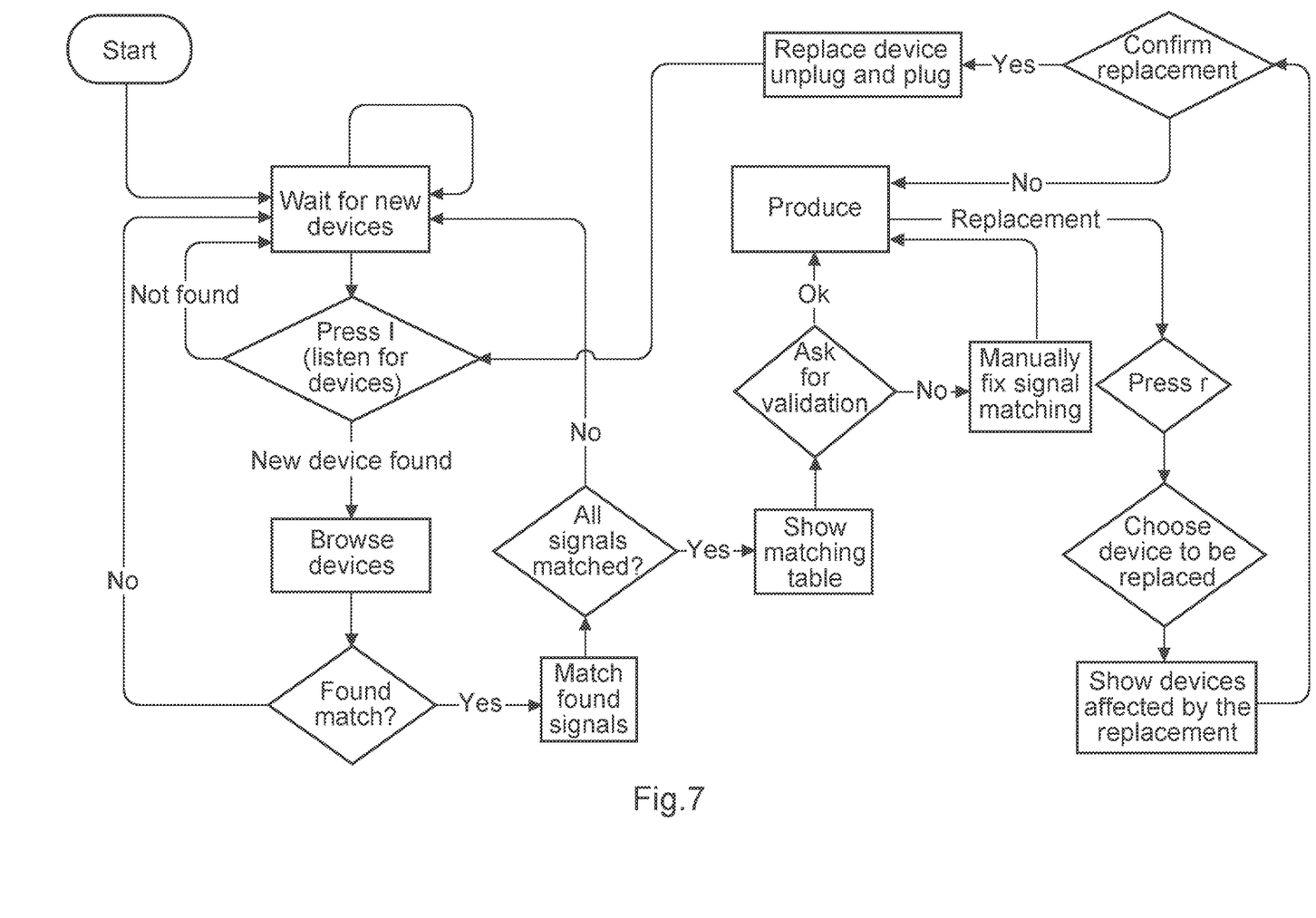
FIG. 7 shows an exemplar control flow diagram of HMI service.

FIG. 7 shows control flow of HMI service. In the demonstrator implementation, the PnPService provides a simple command line interface (CLI). The CLI is used to trigger the different services/functionalities of the PnPService In general, the control flow of the HMI service is separated in two parts: commissioning and device replacement.

The commissioning phase begins directly after startup. In this phase, the PnPService waits for new devices announced by the discovery server/functionality. Therefore, the user presses "1" to listen for new devices. Once a new device shows up, the PnPService browses the device and uses the match service for identifying possible signals to be matched. If a signal is matched and not all signals of the controller are matched yet, the HMI jumps back to the state for listening for new devices. If all signals are matched, the PnPService shows a matching table and asks for a validation of this table. If the user presses "ok", the PnPService will trigger the controller and all other devices to start production. In the other case the matching result may be flawed, such that a manual fix of the signal matching is necessary.

The second part of the HMI service is the announcement of a device replacement. This functionality is triggered by pressing "r" during the production state. After that, the PnPService lists all devices which can be replaced. The user needs to choose the device from the list. In the next step an affected by analysis will be done by the PnPService and presented to the user. Based on this analysis the PnPService ask for a confirmation to replace this device and set all affected by devices in simulation mode. Now the device, which should be replaced, can be unplugged and the new device plugged in. Doing that, the PnPService jumps back to listening, identifying the new device, starting to browse it, and matching the new signals to the unmatched signals in the controller. Once more, the matching table is presented and needs to be validated by the user.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method of commissioning a field device in an industrial system network, the method being implemented by a plug and produce system, the method comprising:
    connecting the field device to the industrial system network;
    providing, by the field device, information about the field device, the information comprising functional information for the field device;
    utilizing the functional information to retrieve, from a server separate from the field device, information relating to a role of the field device in an automation application;
    utilizing the functional information to retrieve from the server at least some capability information relating to a field device type of the field device;
    utilizing the at least some capability information relating to the field device type and the information relating to the role of the field device in the automation application to retrieve from the server a parameter set for the field device for operation in the automation application; and
    downloading the parameter set to the field device,
    wherein the functional information for the field device comprises an identity of the field device,
    wherein the identity of the field device is determined from one or more of:
    a location of the field device in the industrial system network; and
    an identity of one or more devices that are neighbors to the field device, and
    wherein the identity of the field device is inferred from the industrial system network.

2. The method of claim 1, further comprising:
    providing the field device with an address.

3. The method of claim 2, wherein the address comprises a network address.

4. The method of claim 2, wherein providing the field device with the address comprises collecting meta data for the field device and for at least a part of the industrial system network to generate the address that is then provided to the field device.

5. The method of claim 1, wherein the parameter set comprises data relating to a different device of a same device type.

6. The method of claim 1, further comprising mapping the parameter set to the field device.

7. The method of claim 6, wherein the mapping comprises a process of converting at least some of the data of the parameter set.

8. The method of claim 1, further comprising:
    Implementing a browsing process to match a controller to the field device, the matching comprising utilization of control related functionality for the field device.

9. The method of claim 8, wherein the control related functionality comes from an information model implemented in the field device.

10. The method of claim 8, wherein the control related functionality for the field device is comprised within the functional information provided by the device.

* * * * *